United States Patent [19]

Montreuil et al.

[11] Patent Number: 4,815,783

[45] Date of Patent: Mar. 28, 1989

[54] FLOATING CONTAINER CAP

[76] Inventors: Kent B. Montreuil, P.O. Box 12613, San Diego, Calif. 92112; Gary A. Palmejar, 1662 Bluff Point Ct., Chula Vista, Calif. 92011; James H. Pfister, Jr., 1349 Monument Hill, El Cajon, Calif. 92020

[21] Appl. No.: 145,840

[22] Filed: Jan. 20, 1988

[51] Int. Cl.⁴ .............................................. B65D 41/04
[52] U.S. Cl. ..................................... 215/228; 215/364; 215/302; 220/212; 220/304
[58] Field of Search ............... 220/212, 215, 288, 304; 215/228, 356, 364, 13.1

[56] References Cited

U.S. PATENT DOCUMENTS 3,017,047 1/1962 Payson et al. .................. 215/356 X
3,032,224 5/1962 Lou ..................................... 215/13.1

Primary Examiner—Donald F. Norton
Attorney, Agent, or Firm—Brown, Martin, Haller & Meador

[57] ABSTRACT

A floating container cap for liquid storage containers used adjacent to bodies of water or similar liquids, the storage containers having a cylindrical input port of a predetermined internal diameter with a threaded surface for interaction with the container cap, comprising a cylindrical housing which is fluid tight with an external diameter less than the container input port. A generally circular metallic top having a diameter larger than the remainder of the housing forms a top end of the housing and a foam material is disposed inside the housing. To removably secure the cap in place, a plurality of threads are disposed on the outside of the housing adjacent to the top for interfacing with the input port threaded surface.

19 Claims, 1 Drawing Sheet

FLOATING CONTAINER CAP

BACKGROUND OF THE INVENTION

1. Field of the Invention

The present invention relates to container caps or seals for liquid storage containers and more particularly to a floating container cap used to seal such containers. The invention further relates to a container cap for engine lubricants and fuels that is totally separable from the container and floats if accidentally dropped into water.

2. Background of the Art

People have long enjoyed working and playing on bodies of water using an assortment of boats or water borne vehicles. It has long been accepted as a part of this activity that traveling on water, either for work or recreation brings with it the hazard of losing any item not safely stowed on board or attached to a boat in some manner. People accept the loss of objects such as watches, sunglasses, hats, fishing tackle, clothes and other miscellaneous articles as natural casualties of being on the open water.

However, the loss of tools and major accessories or components used in the operation of a boat are not so easily dismissed. Often these items must be replaced immediately for safe or normal operation of the boat and at a great inconvenience or cost. One type of item that falls into this category are the various container sealing caps used for fuel, lubricant, or water supply tanks.

These caps are often fairly large in diameter, on the order of 2 to 3 inches, and made from very thick or heavy metal to withstand the rigors of people standing on them or general abuse. These caps are also made from materials that resist the corrosion of constant exposure to water or salt, all of which makes them very expensive to replace. Unfortunately, such caps are very heavy and sink quickly in water if dropped, never to be recovered.

Fuel or water storage caps are frequently removed for adding new contents to liquid storage tanks before any extensive use of a boat or an extended trip. This means that like an automobile, the tank or container caps, especially for fuel, are removed and set aside while the tank is filled at a pumping facility of some type. However, unlike an automobile, the pumping station is generally located in a marina or other facility with the boat in the water. This frequently leads to a large percentage of the removed caps being accidentally dropped or bumped into the water. Fuel tank caps, especially on larger boats, tend to be relatively expensive and sometimes hard to replace when the boat is in a remote location. Many fuel tanks, as an example, use custom size caps which must be ordered from the manufacturer. Thus, many boat users face substantial delays and expenses in replacing lost container caps.

There have been attempts to modify boat accessories or items used around water to prevent loss. Examples of this are found in U.S. Pat. Nos. 2,693,605, 3,549,042, and 4,190,086.

In U.S. Pat. No. 2,693,605, a flotation attachment for use on boat oars is disclosed which employs a relatively large air tight chamber secured to a middle portion of the oars adjacent to any oar lock structure. The sealed chamber displaces enough water to float the oars should they be dropped into the water. However, this represents the addition of a separate floating structure that increases the bulk and weight of the oars for normal use and storage.

In U.S. Pat. No. 3,549,042, a series of air tight chambers are incorporated in the design of thin metal beverage containers to provide buoyancy when they are empty. This invention is used to float empty cans so that they can be readily retrieved from lakes and streams to decrease the amount of sunken litter created every year. However, these air tight chambers are incorporated as part of a special can structure and only support light weight, empty, beverage cans. These air pockets cannot support a full container or be incorporated into other products.

U.S. Pat. No. 4,190,086 discloses a flotation system employing a floating collar for use in connectors for floating hoses. The collar is a special air tight chamber incorporated as part of the connector structure. The chamber provides some buoyancy to prevent the connector from sinking deep into the water. However, this type of collar adds to the lateral dimensions of the connector, which may be useful for floating hoses stretched out on water, but not for use in container caps and the like which have strict size limitations. Increasing the lateral or radial dimensions of container caps makes them unusable.

An alternative for boats is to incorporate an attachment on the container cap to secure one end of a cable or wire to the cap with the other end secured to the boat. However, cables or wires present unacceptable hazards for injury or entanglement when located close to crew traffic patterns or deck walking areas. In addition, this technique presents an unsightly alternative most boat owners will not use. At the same time, the cap cannot be completely removed from the boats for servicing without extra tools.

What is needed is a method or device for preventing the loss of container caps, such as for fuel, lubricants or water storage tanks, when they are removed from the container near water or similar liquids.

SUMMARY

In view of the shortcomings of the present art, it is an object of the present invention to provide a container sealing cap that floats when dropped in a liquid.

An advantage of the present invention is that it provides a floating cap that is compact and cost effective to manufacture.

Another advantage of the present invention is that it provides a floating cap that maintains desired aesthetic features while remaining impact and corrosion resistant.

These and other objects, purposes and advantages are provided in a floating container cap for use in cylindrical, threaded, container ports of predetermined internal diameter, comprising a cylindrical fluid tight housing having an external diameter less than the port diameter, a metallic top connected to one end of the housing with a diameter larger than the housing and port diameters, a plurality of threads disposed about an upper portion of the housing adjacent to the top, and a foam material disposed inside of said housing.

In further aspects of the invention, the cap housing comprises a lower cylindrical sidewall joined on a top end to an upper cylindrical sidewall and on the other end to a circular bottom wall. The upper and lower sidewalls and bottom wall can have the same or differing diameters leading to a right hand cylinder or a graded or tapering diameter cylindrical housing. The housing generally comprises stainless steel, brass, or chrome coated metal with brass about 0.0125 inches thick being preferred. The metallic top comprises a planar, circular plate with a pair of apertures disposed along a diameter for interacting with prong type wrenches. The apertures are configured to accommodate the maximum prong size typically encountered and have a depth less than the plate thickness. A slot extends between the apertures and is configured to accommodate a large flat head screwdriver. The apertures are positioned at substantially equal radial positions from a center of said plate diameter.

The container cap housing has a diameter larger than about 1 inch with a preferred exterior diameter on the order of between about 1.5 to 3 inches. The cap top has a diameter about 0.25 to 0.5 inches larger than said housing exterior diameter.

The cylindrical housing of the container cap can also be manufactured using a cylindrical sidewall which is open on a bottom end and the foam is configured to fill the internal volume of the housing and form a circular bottom therefor. The foam can also be manufactured to extend below the sidewall as a right hand cylinder having substantially the same exterior diameter as the sidewall or stepped to have a diameter less than the sidewall. In the alternative, the foam extends below the sidewall in the form of a frustoconical body having a bottom diameter less than the sidewall.

BRIEF DESCRIPTION OF THE DRAWINGS

The novel features of the present invention may be better understood from the accompanying description when taken in conjunction with the accompanying drawings in which like characters refer to like parts and in which.

DETAILED DESCRIPTION OF A PREFERRED EMBODIMENT

The present invention provides a container cap for sealing a liquid storage container, such as those typically used for holding water, fuel, or lubricants, which is capable of being totally removed from the container during filling and use and not lost due to accidental placement in a liquid, such as water. This is accomplished by providing a generally cylindrical cap having a sealed housing with a metallic top, apertures in the top for engaging rotation assistance devices, a floatescent insert and a threaded sidewall.

Figure 1:
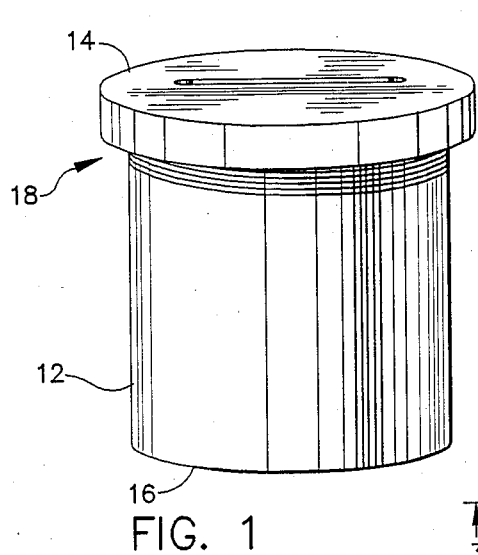
FIG. 1 illustrates a perspective view of a floating cap constructed according to the principles of the present invention.

A floating container cap constructed according to the principles of the present invention is illustrated in the pespective view of FIG. 1. In FIG. 1, a container cap 10 has a fluid tight housing comprising a cylindrical sidewall 12 connected to one end to a circular top 14 and on the other to a circular bottom wall 16.

The sidewall 12 comprises a thin metallic material, such as brass or stainless steel, in order to combine strength, corrosion resistance and light weight. These materials can be formed to provide a desired structural integrity while decreasing the overall weight of the cap 10. An exemplary sidewall material is about 0.10 to 0.15 inch thick brass which shows excellent corrosion resistance, with 0.125 being preferred. Chrome plated metals could also be employed for the sidewall 12 but galvanized or similar treated materials tend to corrode when used for extended periods around salt water and diesel fuels.

Figure 3:
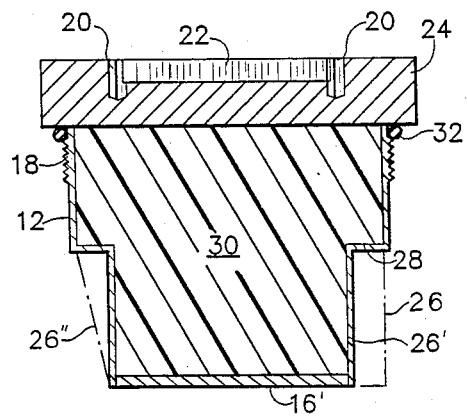
FIG. 3 illustrates a side sectional view through the cap of FIG. 1 including a top portion.
Figure 4:
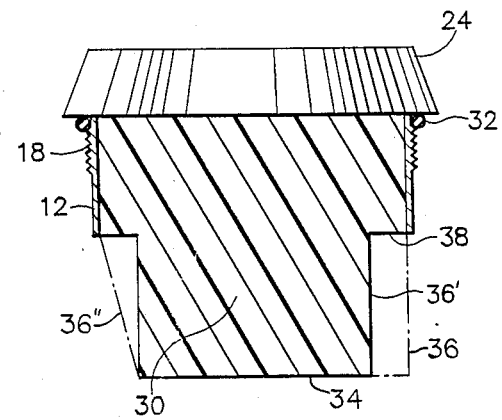
FIG. 4 illustrates a side view of the cap of FIG. 1 with a portion sectioned.

The sidewall 12 can be formed using a variety of construction techniques including, but not limited to, extrusion, casting, rolling, or hollowing solid or thick cylinders. One preferred method of forming the sidewall 12 comprises stamping or pressing thin sheets or material to form the sidewall 12 and bottom wall 16 as a single unitary structure. This type of construction also allows implementation of angled sidewalls as shown in FIGS. 3 and 4 and described further below.

An upper portion of the sidewall 12 adjacent to the top 14 has a series of threads 14 formed therein to interface with existing container port structures. Thread configurations are well known to those skilled in the art of container manufacture and are known throughout the boating industry with some sizes being standard. Therefore, when the sidewall 12 is manufactured, the threads 18 are cut or formed in the wall at the desired pitch for the particular container application. Because thread formation by cutting may decrease the sidewall thickness below an acceptable magnitude, other techniques may be used.

First, the sidewall 12 and bottom wall 16 are manufactured at a primary thickness and the threads formed in a separate metallic cylinder only slightly larger in diameter than the sidewall 12. The secondary, threaded, cylinder is positioned over the sidewall 12 and secured in place using fastening techniques such as welding, soldering, or bonding. Second, the sidewall 12 is formed from material having a thickness gradient and with the thickness increasing in the area to be threaded.

The top 14 comprises a relatively thick plate of metal which is joined to the sidewall 12 by techniques such as brazing or soldering. An exemplary plate is about 0.25 to 0.50 inches thick although other thicknesses can be employed. A minimum thickness of about 0.31 inches is generally required to accommodate the weight of people stepping or the cap as well as the general abuse received from dropping or being hit by other objects.

The top plate 14 can have an annular recess with theaded walls for receiving the upper end of the sidewall 12 which can have matching threads or simply be soldered, welded or bonded into place. Alternatively, the top 14 can be formed, such as by casting or machining from large stock, with an upper cylindrical sidwall extending down from the underside of the top. The thinner sidewall 12 is then joined to this thicker upper sidewall which accommodates threads as required. The threaded portion of the sidewall 12 can also comprise a solid cylindrical projection from the bottom of the top 14. However, a solid projection uses more material and increases weight which is generally undesirable. Therefore it is anticipated that a reasonable amount of material would be removed from inner diameter portions of the upper sidewall projection.

A preferable material for the top 14 is polished brass or a chrome coated steel. These materials provide excellent resistance to wear and corrosion while also providing aesthetic appearance. Therefore, these materials are generally preferred for boating applications.

There are a variety of cap wrenches that use cylindrical prongs for insertion into holes for engaging a cap or similar device and providing added torque, as required, to open the cap. At the same time, when a cap is stuck, a screwdriver is often helpful for increasing the torque exerted on the cap. Therefore, to allow the use of these tools the top 14 includes two cylindrical apertures 20 and a recessed slot 22.

Figure 2:
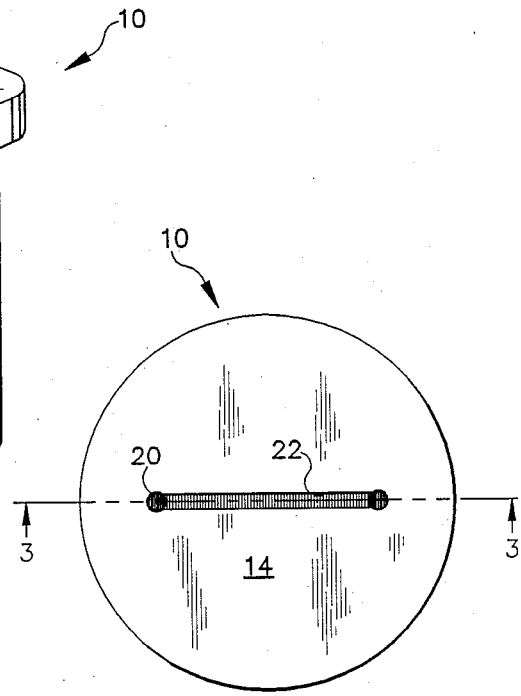
FIG. 2 illustrates a top plan view of the cap of FIG. 1.

As shown in FIGS. 2 and 3, the apertures 22 are positioned along a common diameter with approximately equal radial spacing from the center of the top 14. This allows application of a balanced force on the cap 10. The apertures 20 can be made in a variety of sizes with a 0.25 inch diameter being preferred, so as to accommodate the typical wrench dimensions. The apertures 20 are made any depth desired short of penetrating the top 14 and destroying the fluid tight seal for the cap 10. The slot 22 is fairly shallow, typically not as deep as the apertures 20.

Where desired, either for extra torque or friction in turning the top 14 or for aesthetics, the top 14 can have a beveled or chamfered edge 24. This edge can also have a knurled or scalloped surface to decrease slippage when the cap is wet. However, for most boating applications a straight vertical side or a right cylinder shape for the top 14 is preferred.

The sidewall 12 is shown projecting straight down from the top 14 in FIG. 1 but other configurations are illustrated in FIGS. 3 and 4. In FIG. 3, the sidewall 12 is shown terminating just below the threads 18. From here a lower cylindrical sidewall 26 extends down to the bottom plate 16, as shown by the construction line 30 26.

To allow easier insertion and removal of the cap 10 from a container port, and to make alignment easier the sidewall 26 is often of smaller diameter than the sidewall 12. This is illustrated in FIG. 3 as sidewall 26'. Therefore, an intermediate wall 28 is employed to extend between the upper sidewall 12 and the lower sidewall 26'. The intermediate wall 28 is an annular plate secured between the two sidewalls 12 and 26'. Alternatively, the lower sidewall 26 is configured as a lower sidewall 26" which extends downward at an inward angle until it connects to a bottom wall 16' having a smaller diameter than the sidewall 12. This latter construction is illustrated in FIG. 3 using the construction line 26".

Using these latter two configurations also allows the use of a metallic sidewall 12 for the threads 18 and a thin plastic sidewall 26 which extends up behind the threads 18. In this application the walls 26 (26', 26"), 28, and part of 12 can be formed in a single manufacturing step as by pressing or injection molding. However, many plastics are not rated to withstand exposure to the fuels and lubricants employed in boating and are not impact resistant enough for rough usage. Therefore, the brass sidewalls are still preferred.

The wall 28 or the upper edge of a conical wall 26" can be secured to the bottom edge of the sidewall 12 by an adhesive or epoxy compound. If desired the lower edge of the wall 12 can have a crimped edge or other means for folding over the wall 28 to help secure it in place. A raised edge or lip can also be employed where brazing or hard solder bonding techniques are employed.

The container cap 10 does not rely on air pressure in the housing to create flotation. Instead a foam material 30 is disposed within the confines of the sidewall 12 (26, 28), bottom wall 16, and top 14 to assure flotation through displacement of water or other liquid the cap is dropped into. A variety of foam materials can be used depending on the volume of the container cap 10. That is, the type of foam chosen depends primarily on the density required to assure displacement of a minimum amount of liquid to float a given cap. The volume is in turn determined substantially by the overall diameter of the container port, which sets a limit for the sidewall 12 diameter and the size of the top 14 required to cover the container port. The top size in turn, combined with its thickness, determines its weight. Based on the width, and other dimensions for the cap 10 the weight to density ratio for the foam is then determined and foam materials within this range are used.

Exemplary materials are closed cell foams such as poly-vinyl formaldehyde, or urethane polymners as well as polyethylene, silicon, epoxy, and vinyl resins when treated with blowing agents to inject a sufficient quantity of gas into the structure. Polystyrene is generally considered inadequate for this task. U.S. Pat. No. 3,830,760, which is incorporated herein by reference, discloses a foam structure found useful for the preferred embodiment both in terms of density and manufacture technique.

An alternate construction of the container cap 10 uses the foam to complete the lower portions of the housing 12 to save weight. In this configuuration the cylindrical sidewall 12 is open on the bottom end and the foam 30 is configured to fill any internal volume of said housing and form a circular bottom. The foam can extend below the bottom edge of the sidewall as a right hand cylinder having a lower sidewall portion 36 with substantially the same exterior diameter as the sidewall 12. The lower section of the foam 30 can also be configured with a slanted sidewall 36" or be stepped to have a narrower diameter sidewall 36' using an annular step section 38. The foam can also extend below the sidewall in the form of a frustoconical body having a bottom diameter less than the sidewall 12. Containers have a variety of sizes depending upon the overall use, be it for fuel, water, lubricants, etc. A typical diesel fuel container or boat storage tank has an inlet or fuel port on the order of 2 to 2.5 inches in diameter. Container caps for water and lubricants are generally smaller. Therefore the exterior diameter of the sidewall 12 is less than the maximum dimensions found in containers of interest such as 3 inches. At the same time, the sidewall 12 is made as close to the container port size as possible in order to allow maximum displacement of water in a minimum cap 10 height.

It is also common to employ a seal, such as an O-ring 32 adjacent to the threads 18 to prevent the escape of any fumes and minimize fire and explosion hazards.

What has been described in a floating container cap that finds advantageous use on liquid storage containers used around water and similar liquids which floats while maintaining ease of use, economy of construction and desired aesthetics.

The foregoing description of a preferred embodiment has been presented for purposes of illustration and description. It is not intended to be exhaustive nor to limit the invention to the precise form disclosed, and many modifications and variations are possible in light of the above teaching. The embodiment was chosen and described to best explain the principles of the invention and its practical applications to thereby enable others skilled in the art to best utilize the invention in various embodiments and with various modifications as are suited to the particular use contemplated. It is intended

What we claim as out invention is:

1. A floating container cap for liquid storage containers used adjacent to bodies of water or similar liquids, the storage containers having a cylindrical input port of a predetermined internal diameter with a threaded surface for interaction with the container cap, comprising:
    a cylindrical housing, said housing being substantially fluid tight and having an exterior diameter less than said port internal diameter;
    a metallic top connected to one end of said housing having a diameter larger than said housing and port diameters;
    a plurality of threads disposed about an exterior portion of said housing adjacent to said top, said threads configured to match said port threaded surface; and
    a foam material disposed inside of said housing, said foam material comprising means for assuring flotation of said cap on liquid into which said cap is dropped.

2. The container cap of claim 1 wherein said top and said housing comprise material chosen from the group of stainless steel, brass, or chrome coated metal.

3. The container cap of claim 1 wherein said cylindrical housing comprises
    an upper cylindrical sidewall having a first exterior diameter;
    a lower cylindrical sidewall having a second exterior diameter and being joined on a top end to said upper sidewall; and
    a circular bottom wall having a third exterior diameter and being connected to a bottom end of said lower sidewall.

4. The container cap of claim 3 wherein said side and bottom walls comprise brass on the order of 0.012 inches thick.

5. The container cap of claim 3 wherein said upper and lower sidewalls and said bottom have substantially equal exterior diameters.

6. The container cap of claim 3 wherein said lower and bottom walls have exterior diameters less than said upper sidewall diameter and further comprising an annular wall extending between and connected to a lower portion of said upper sidewall and an upper portion of said lower sidewall.

7. The container cap of claim 3 wherein said bottom wall exterior diameter is less than said upper sidewall exterior diameter, and the exterior diameter of said lower sidewall varies from the diameter of said upper sidewall on said top end and to the bottom wall diameter on said bottom end.

8. The container cap of claim 1 wherein said housing has a diameter larger than about 1 inch.

9. The container cap of claim 1 wherein said housing has an exterior diameter on the order of between about 1.5 to 3 inches.

10. The container cap of claim 1 wherein said housing has cylindrical sidewalls less than about 2.75 inches in diameter.

11. The container cap of claim 1 wherein said top has a diameter about 0.25 to 0.5 inches larger than said housing exterior diameter.

12. The container cap of claim 1 wherein said top has a diameter of about 1.87 inches and said housing has an exterior diameter of about 1.56 inches.

13. The container cap of claim 12 wherein said cap has an overall height on the order of 4 inches.

14. A floating container cap for liquid storage containers used adjacent to bodies of water or similar liquids, the storage containers having a dylindrical input port of a predetermined internal diameter with a threaded surface for interaction with the container cap, comprising:
    a cylindrical housing, said housing being substantially fluid tight and having an external diameter less than said port internal diameter;
    a metallic top connected to one end of said housing having a diameter larger than said housing and port diameters, wherein said metallic top further comprises:
    a planar, circular plate of a predetermined thickness;
    a pair of engagement apertures disposed along a plate diameter for interacting with premade prong type wrenches, said apertures having a diameter determined by a maximum prong size and a depth less than said thickness and being positioned at substantially equal radial positions from a center of said plate diameter, and
    a slot extending between said engagement apertures, said slot having a depth less than said apertures and being wide enough to accommodate large flat headed screwdrivers;
    a plurality of threads disposed about an exterior portion of said housing adjacent to said top, said threads configured to match said port threaded surface; and
    a foam material disposed inside of said housing.

15. The container cap of claim 14 wherein the top has a slanted vertical edge.

16. A floating container cap for liquid storage containers used adjacent to bodies of water or similar liquids, the storage containers having a cylindrical input port of a predetermined internal diameter with a threaded surface for interaction with the container cap, comprising:
    a cylindrical housing, said housing being substantially fluid tight and having an exterior diameter less than said port internal diameter wherein said cylindrical housing comprises a cylindrical sidewall being open on at least a bottom end;
    a metallic top connected to one end of said housing having a diameter larger than said housing and port diameters;
    a plurality of threads disposed about an exterior portion of said housing adjacent to said top, said threads configured to match said port threaded surface; and
    a foam material disposed inside of said housing, said foam being configured to substantially fill an internal volume of said housing and form a circular bottom therefor.

17. The container cap of claim 16 wherein said foam extends below said sidewall and is configured as a right hand cylinder having an exterior diameter substantially the same as said sidewall.

18. The container cap of claim 16 wherein said foam extends below said sidewall and the foam extending beyond the limits of said sidewall is configured as a right hand cylinder having an exterior diameter less than said sidewall.

19. The container cap of claim 16 wherein said foam extends below said sidewall in the form of a frustoconical body having a bottom diameter less than said sidewall.

* * * * *